United States Patent [19]
Muehllehner

[11] 3,936,340
[45] Feb. 3, 1976

[54] METHOD FOR MAKING CORRUGATED COLLIMATORS FOR RADIATION IMAGING DEVICES

[75] Inventor: Gerd Muehllehner, Mount Prospect, Ill.

[73] Assignee: G. D. Searle & Co., Skokie, Ill.

[22] Filed: Feb. 16, 1973

[21] Appl. No.: 332,934

Related U.S. Application Data

[63] Continuation-in-part of Ser. No. 52,924, July 7, 1970, abandoned.

[52] U.S. Cl. .................. 156/210; 72/196; 156/292; 156/313; 250/515
[51] Int. Cl.² .................... B32B 31/12; G21C 11/00
[58] Field of Search ............ 250/505, 515; 156/205, 156/210, 292, 313; 72/196

[56] References Cited
UNITED STATES PATENTS

| 838,568 | 12/1906 | Numan | 72/196 |
|---|---|---|---|
| 1,937,466 | 11/1933 | Smith et al. | 72/196 |
| 2,731,713 | 1/1956 | Schaefer | 29/423 |
| 2,823,460 | 2/1958 | Weiler | 156/210 |
| 3,033,734 | 5/1962 | Price | 156/305 |
| 3,191,418 | 6/1965 | Modine | 72/196 |
| 3,290,205 | 12/1966 | Goldstein et al. | 156/205 |
| 3,320,044 | 5/1967 | Cole et al. | 156/205 |
| 3,450,876 | 6/1969 | Kern et al. | 250/505 |
| 3,540,079 | 11/1970 | Bush | 264/286 |
| 3,541,829 | 11/1970 | Engleman | 72/196 |
| 3,543,384 | 12/1970 | Hansen | 250/505 |

Primary Examiner—Douglas J. Drummond
Assistant Examiner—Basil J. Lewris
Attorney, Agent, or Firm—Walter C. Ramm; Charles H. Thomas, Jr.; Peter J. Sgarbossa

[57] ABSTRACT

Disclosed is a method for making corrugated collimators for radiation imaging devices. Strips of lead foil are corrugated in a pair of gear-like members, and the corrugated strips are mounted between straight strips to build up a honeycomb-like collimator structure. Specific techniques for producing parallel channel and converging or diverging channel collimators are illustrated.

5 Claims, 20 Drawing Figures

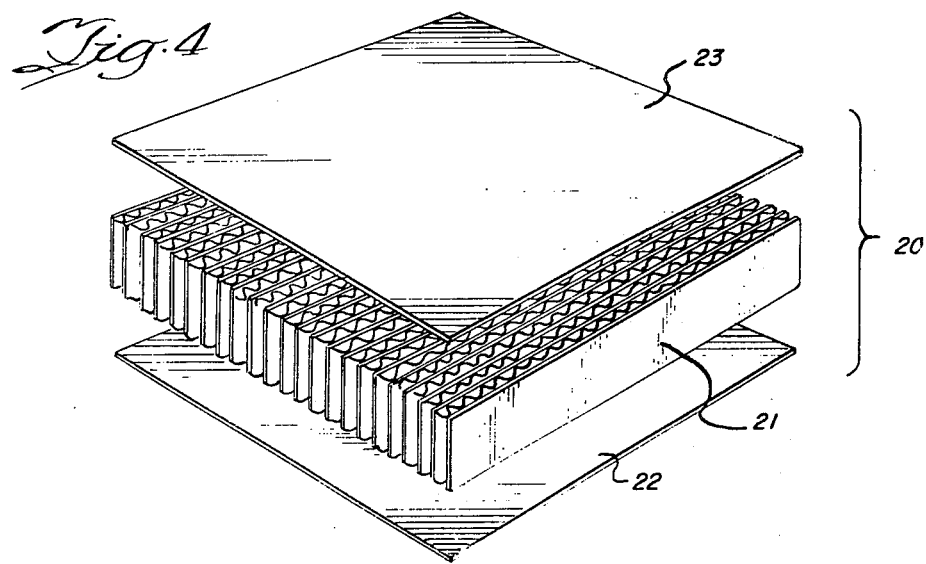
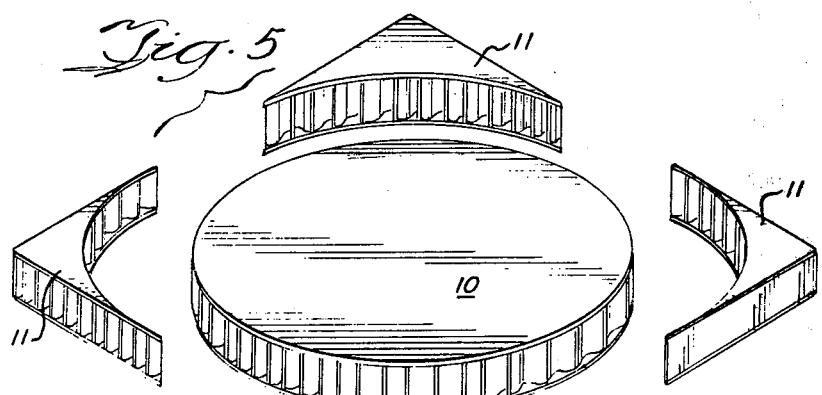
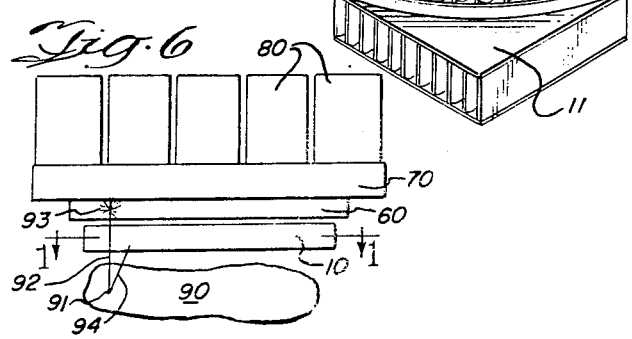

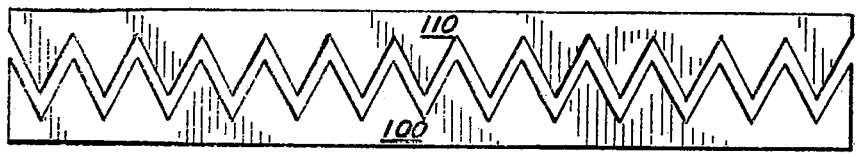
FIG. 7
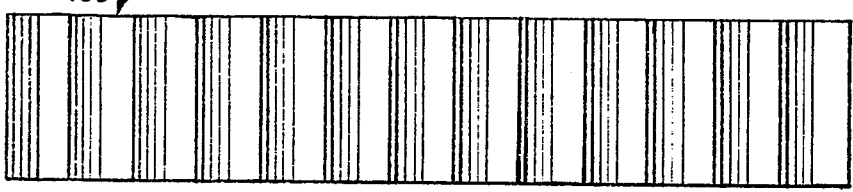
FIG. 8
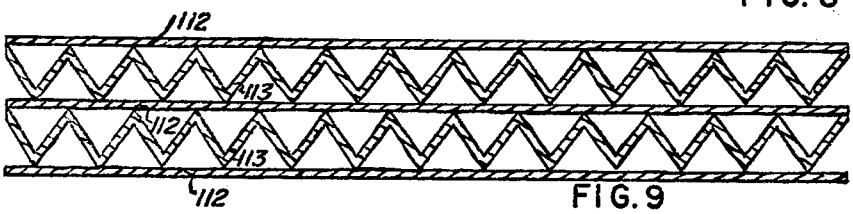
FIG. 9
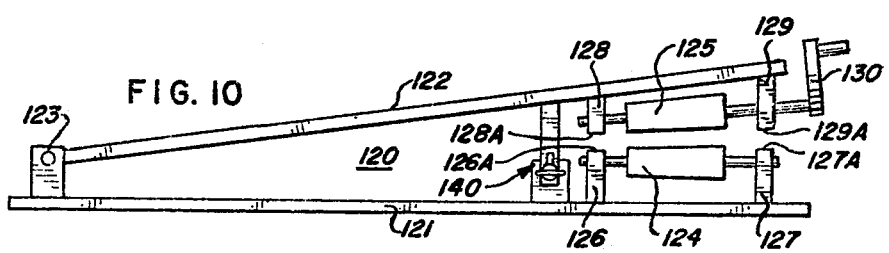
FIG. 10
FIG. 11
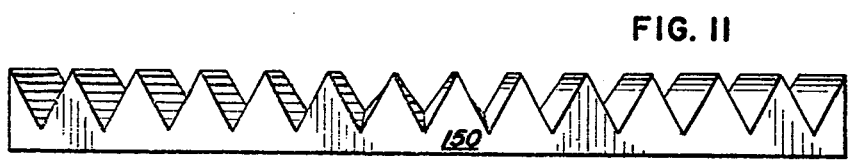
FIG. 12
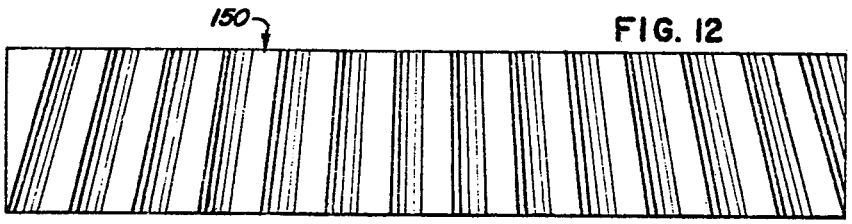

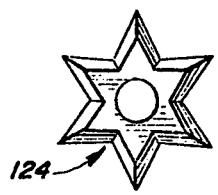
FIG. 13
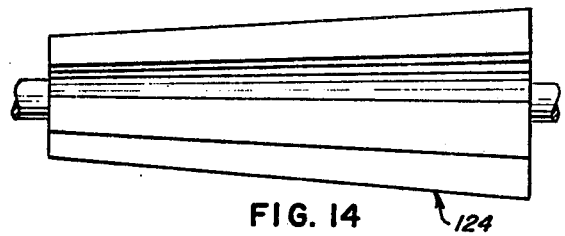
FIG. 14
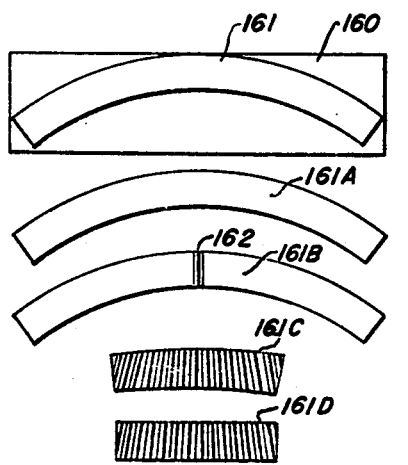
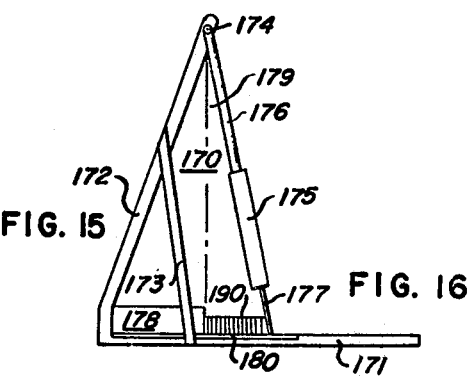
FIG. 15    FIG. 16
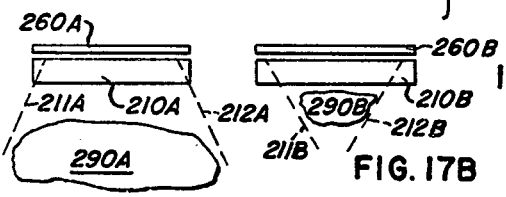
FIG. 17A    FIG. 17B
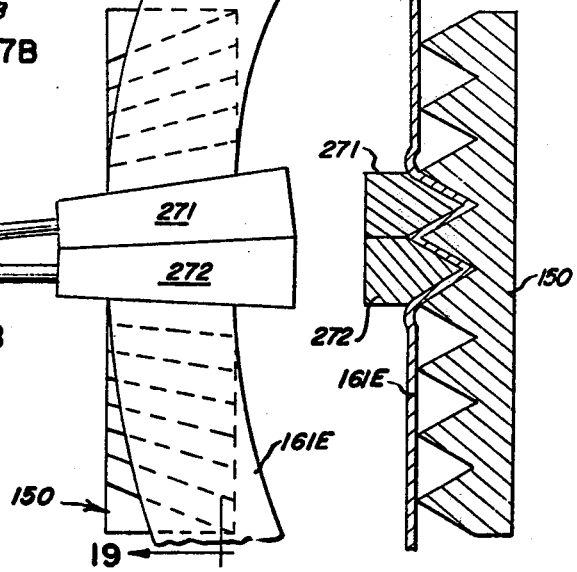
FIG. 18    FIG. 19

METHOD FOR MAKING CORRUGATED COLLIMATORS FOR RADIATION IMAGING DEVICES

This application is a continuation-in-part of application Ser. No. 52,924, filed July 7, 1970, now abandoned.

Radiation cameras typically employ a radiation collimator of some type between the radiation sensitive transducer and the radioactive object under investigation. The most widely used radiation camera is the Anger-type scintillation camera (U.S. Pat. No. 3,011,057), which is employed in hospitals to obtain an image of the distribution of a radiopharmaceutical introduced into the body of a human patient. The purpose of a radiation collimator is to provide substantially one gamma ray transmissive passageway between each elemental volume of the radioactive object and a corresponding elemental volume of the transducer. The most commonly used collimator is the multichannel collimator which comprises a number of collimating apertures separated from each other by a volume of radiation-opaque material—most commonly lead.

It is well known that radiation collimator design involves basically the parameters of aperture size and shape, septal thickness, and aperture length. These are the parameters which determine the resolution and efficiency of the collimator for gamma rays of a particular energy. In general, the septal thickness, which is the thickness of the walls separating adjacent collimating apertures, is chosen in accordance with the energies of gamma rays to be collimated so that the collimator will block substantially all gamma rays which enter the collimator at an angle and location such that they would otherwise traverse the wall between two apertures. Thus the septal thickness must be relatively large for high energy gamma emitting isotopes, but for low energy isotopes the septum or wall between apertures may be quite thin. Indeed, it is desirable to employ only the septal thickness actually required for the gamma ray energy involved in order to avoid unnecessary loss of efficiency.

Initially, all multi-channel collimators were of the parallel channel type. The first parallel channel collimators were cast-lead collimators. Later, extruded lead collimators consisting of comb-shaped pieces assembled to provide square-channels were designed to achieve better imaging efficiency for low energy isotopes. As imaging with technetium-99m having a 140 KEV gamma energy began to dominate imaging procedures and improvements in resolution of radiation cameras were made, radiation collimators with very thin septa (i.e. about 0.010 inches) were needed to avoid loss of efficiency in imaging.

Faced with this need, some investigators turned to the general approach of using corrugated foil of a material which is relatively opaque to low energy gamma rays. The corrugation approach would at first seem to offer a simple solution to the problem of constructing a collimator with septa of about 0.010 inch in thickness by enabling a large number of corrugated strips of metal foil to be mounted together in rows to build up a structure of the desired size. It turns out, however, that the use of a multiplicity of corrugated strips creates rather severe tolerance problems because the corrugations must be extremely uniform from strip-to-strip or they won't match up at the surfaces which are to be mated and fastened together throughout the length of each strip. The larger the collimator and the smaller the corrugation, the greater the tolerance problem. In addition, since lead is the preferred collimator material from a cost standpoint, the corrugating of lead foil which has a very low tensile strength creates an additional problem, especially when relatively large volume production is needed.

The problems involved in employing corrugated lead foil in the construction of a low energy radiation collimator are solved in accordance with the present invention by mounting the corrugated strips of foil between successive straight strips of foil, thereby eliminating the basic tolerance problem in forming the corrugated strips so they can be matched up and in handling the rather easily distorted strips after they have been formed. In accordance with another aspect of this invention, this solution also leads to an improved method of constructing a corrugated-strip collimator using adhesives such as epoxy rather than welding or similar techniques. In addition, in accordance with a further aspect of this invention, the problem of forming corrugated lead strips is solved by using a highly advantageous new method in which straight strips of lead foil are corrugated by using a pair of substantially meshed gear-like members. These initially corrugated strips either are employed as is or, to produce a collimator with superior uniformity, are subjected to further forming by pressing them between male and female forming dies.

The general techniques of this invention are also extremely useful in manufacturing corrugated diverging or converging collimators in an inexpensive manner. A diverging collimator has the multiple collimator channels focused at a point some distance away and arranged to diverge in the transducer to object sense so that objects larger than the transducer can be imaged. A converging collimator has the focused channels arranged to converge in the transducer to object sense so that objects smaller than the transducer are imaged in a magnified way.

The first commercially available diverging collimator was designed for medium energy gamma rays because such a design employs thick septa between channels and can be made by conventional lead casting or drilling techniques. Attempts to use casting techniques to produce a low energy diverging collimator failed because void areas in the thin septa could not be avoided. An approach involving assembling about 15,000 individual thin-walled lead tubes, each having an appropriate taper to produce divergent channels, was successful, but turned out to be extremely costly to manufacture. Adapting the corrugated collimator approach to produce diverging and converging collimators reduces the manufacturing cost dramatically and produces a collimator which is virtually identical in performance to the multiple tapered tube design.

To produce a collimator with converging channels a pair of gear-like members having tapered teeth are employed to produce initial corrugated strips which have tapered corrugations generally pointing to a common focus. The initial corrugated strips are pressed between a set of male and female forming dies to produce highly regular, tapered, triangular corrugations which focus to a point. These corrugated strips are mounted between straight strips, using an alignment fixture, and the taper of each strip causes the assembled strips to focus to a common line. The final collimator structure has collimating apertures which focus to a short line segment such that no observable distortion due to imperfect focus is noticeable.

Other features and advantages of this invention will be apparent from a consideration of the detailed description below together with the accompanying drawings which are briefly described as follows:

FIGS. 2–5 are exemplary of a method for constructing a collimator in accordance with this invention;

FIG. 6 is a schematic view of the employment of a parallel channel corrugated collimator in an Anger camera system;

FIGS. 7–9 are exemplary of an improved method for constructing a parallel channel collimator in accordance with this invention;

FIGS. 10–16 are exemplary of a method of constructing a diverging or converging channel collimator in accordance with this invention;

FIGS. 17A and 17B are schematic views of the employment of a diverging channel collimator and a converging collimator, respectively; and FIGS. 18 and 19 are exemplary of an alternate approach to performing some of the steps of the method of this invention.

Figure 1:
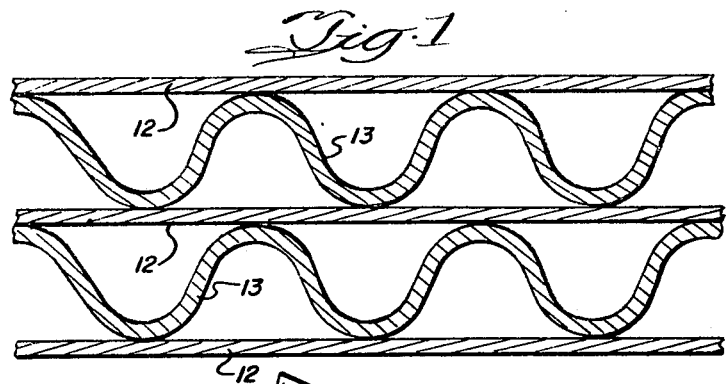
FIG. 1 is an exemplary portion of a section view through a collimator constructed in accordance with this invention (along the lines 1—1 in FIG. 6)

Referring to FIG. 1, the basic cross-sectional configuration of a collimator in accordance with this invention is shown as corrugated lead foil strips 13 mounted between successive straight strips 12 of lead foil. In FIG. 1 the thickness of the foil is exaggerated, and for 140 KEV gamma rays the preferred thickness would be about 0.010 inches. It should be understood that foils of material other than lead but which are highly opaque to gamma rays could also be used here but lead is preferred from a cost standpoint. The sinusoidal-like corrugations are formed by a technique later to be described, but it should be understood that other forms of regularly corrugated strips such as the triangular form shown in FIG. 9 could also be employed. The corrugated strips are preferably substantially aligned so that triple-thicknesses of metal are avoided, but the employment of straight strips of lead foil between corrugated strips eliminates any severe tolerance problem in forming and assembling the strips. As will later be explained in more detail, the strips may be mounted together with an adhesive such as epoxy and the use of straight strips thus also eliminates the need for more sophisticated fastening techniques, such as welding. As is evident, the open areas formed by the walls of the straight and corrugated strips are the collimating apertures through which gamma rays may pass unhindered, and as previously mentioned the fact that the apertures are not axially symmetric does not seriously affect the performance of the collimator.

Figure 2:
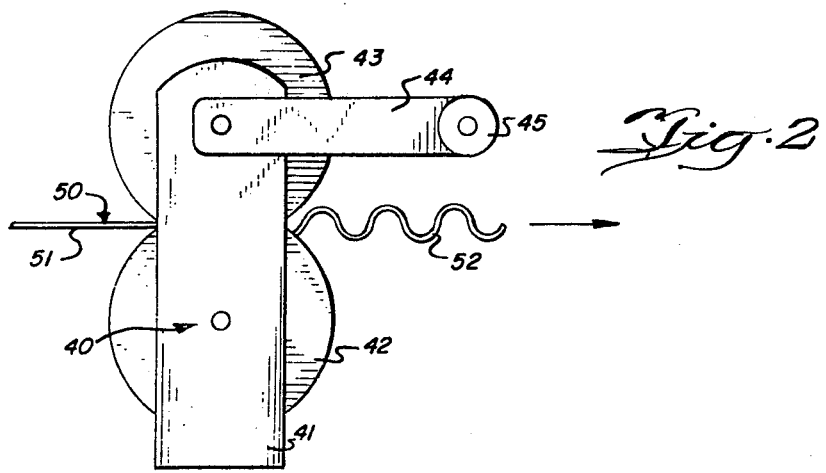

As shown in FIG. 2, corrugated strips of lead foil may be constructed by passing a strip 50 of lead foil through a pair of substantially meshed gear-like members, such as pinion wire rollers 42, 43. Lead foil strip 50 has a straight portion 51 entering the rollers and a corrugated portion 52 coming out of the rollers. Rollers 42 and 43 are mounted on a support structure 40 having vertical members 41 on which the rollers are rotatably mounted. One of the rollers is turned by a hand crank 44 with a handle 45. The rotation could also be mechanized. Rollers 42 and 43 must be mounted in slightly less than a completely meshed relation to accommodate the thickness of lead foil so that the foil will not be stretched to a lesser thickness at certain points as it is pulled through the rollers. "24 pitch" pinion wire rollers produce corrugated strips which have an effective aperture size of about 1.6 or 1.7 millimeters with lead foil of 0.010 inch thickness.

Figure 3:
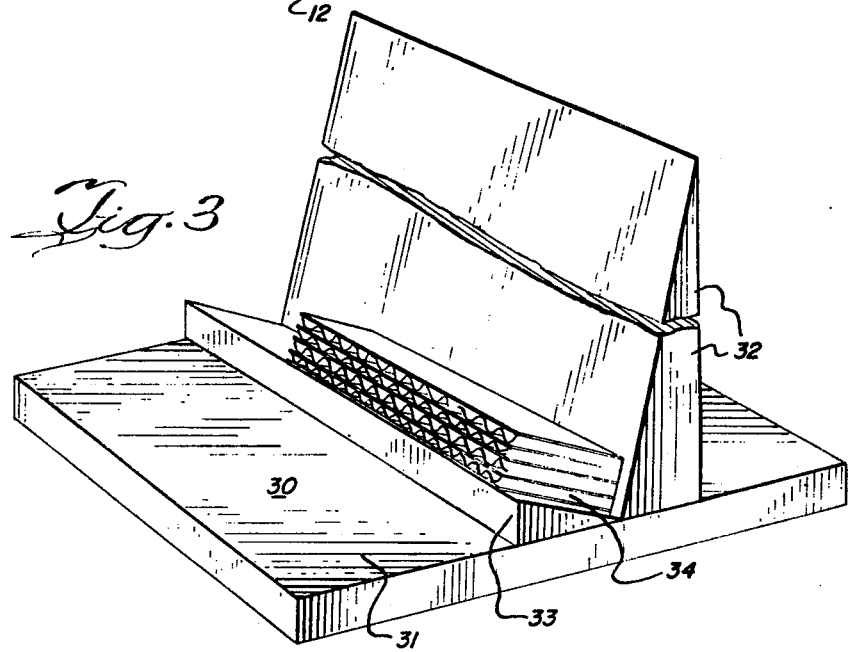

FIG. 3 shows a collimator being assembled from the corrugated and straight lead strips (the size of the corrugations is exaggerated for pictorial clarity). A fixture 30 is useful in assembling the strips since the walls of support sections 32 and 33 mounted on base 31 intersect at a 90° angle and can be used to keep the strips at a 90° angle to the resulting face of the collimator. Using the fixture 30, a collimator may be constructed by the following technique. A flat strip with epoxy spread on one side is placed on support 33, epoxy side up (an epoxy such as "Bondmaster 773B" from PPG Industries may be used). Then, a corrugated strip is placed on top of the epoxied strip. A second flat strip with epoxy spread on both sides is placed on top of the corrugated strip, and a second corrugated strip is then placed upon the flat strip. Preferably the second corrugated strip is aligned with the first one as closely as the eye can tell. This laying down of a flat strip with epoxy on both sides followed by a corrugated strip is continued until the desired size of collimator is achieved. Of course, the lengths of the strips must also be selected in accordance with the desired size of collimator. It is preferable to "load" the collimator structure after every inch or so of strips is built up to insure that the strips are tightly packed together. This can be done by resting a solid lead block on the strips for a short time. In FIG. 3 a partial collimator assembly 34 is shown on the fixture 30.

When the desired number of strips have been assembled into a square array of appropriate size, a pair of thin aluminum sheets 22 and 23 may be epoxied onto the square honeycomb-like array 21 as shown in FIG. 4 to build up the assembly 20. At least one such sheet should be used to provide addtional structural rigidity to the assembly as well as to protect the edges of the strips from performance-damaging deformations. Two sheets are preferred to provide even more rigidity and protection. The thin aluminum sheets are essentially transparent to gamma rays of 140 KEV energy.

After the epoxy in assembly 20 has set, the corners 11 thereof may be removed with a band saw, leaving a circular central portion 10 as the resulting collimator. This circular collimator disc usually serves as an insert in a collimator mounting frame which attaches to the head of a scintillation camera. A schematic side view of the elements in an Anger-type scintillation camera are shown in FIG. 6. Collimator 10 is interposed between a subject 90 containing a radioisotope distribution and a thin sodium iodide crystal 60. A light pipe 70 transmits light from crystal 60 to a matrix of photomultiplier tubes 80. Parallel channel collimator 10 functions essentially to allow only those gamma rays which are emitted from a location in object 90 in a direction substantially perpendicular to crystal 60, i.e. substantially parallel to apertures in collimator 10, to reach crystal 60. Thus a gamma ray 92 from a location 91 interacts in crystal 60 to produce a scintillation 93. A gamma ray headed off at a different angle such as the ray designated 94 will probably be absorbed in one or more walls of collimator 10. All of the functional details of a scintillation camera are well known and need not be further explained here.

FIG. 9 shows an alternate form of a corrugated collimator according to this invention. Here corrugated strips 113 have a triangular configuration. A collimator constructed with this form of corrugated strip has a somewhat improved performance which is more reproducible in volume production. Highly regular triangular corrugations are produced by first forming initial corrugated strips in gear-like members 42 and 43 in FIG. 2, and then pressing each strip between male and female forming dies 100, 110 shown in FIGS. 7 and 8. Gear-like members 42 and 43 are either pinionwire rollers, as previously disclosed, or rollers with triangular teeth. It is vital to form initial corrugated strips in order to have sufficient metal between forming dies 100, 110 such that no tearing or excessive stretching of the lead strips is produced. Thin lead strips are not sufficiently ductile to enable the corrugated strips to be formed directly from straight strips in forming dies 100 and 110. The method of forming highly regular, triangular corrugations thus involves an additional step, and the collimator produced with triangular corrugations is somewhat superior to one with sinusoidal-like corrugations.

The corrugation method of collimator construction is also highly advantageously employed to produce converging or diverging channel collimators. The equipment shown in FIGS. 10–14 is employed to form corrugated strips of lead foil which have the characteristics that the triangular corrugations focus to a common point and are tapered, with wider and deeper corrugations at portions remote from the focal point. Because of the tapered corrugations, the strips stack in such a way that they all point to a common focal line. The resultant collimator is a highly satisfactory diverging or converging collimator for use in imaging low energy radiopharmaceuticals.

FIG. 10 shows apparatus 120 for producing an initial corrugated strip for a converging or diverging collimator. A base 121 supports in a rotatable fashion a tapered gear-like member 124 on a pair of posts 126, 127. A support arm 122 is mounted on base 121 by way of a pivot structure 123. Support arm 122 carries a second tapered gear-like member 125 on a pair of posts 128, 129. 130 refers to a crank for turning tapered gear-like member 125. 140 refers generally to a locking apparatus for maintaining base 121 and arm 122 in a set relationship when the gear-like members are engaged. When arm 122 is pivoted downward, surfaces 128A and 129A on posts 128 and 129 rest on surfaces 126A and 127A on posts 126 and 127. These surfaces are machined or shimmed such that, when in contact, the degree of meshing or engagement of gear-like members 124 and 125 is proper for receiving and forming an initial corrugated strip.

FIGS. 13 and 14 show that gear-like member 124 has tapered triangular teeth to form tapered triangular corrugations in a flat strip. The diameter of gear-like member 124 and the size and taper of triangular teeth thereon determine the focal point of the initial corrugated strip.

Preferred method steps for producing an initial corrugated strip will now be detailed in conjunction with FIGS. 10 and 13–15. The first step is to form a flat strip of lead foil with curved top and bottom edges (strip 161A, FIG. 15). This is formed by cutting or stamping curved strip 161 from rectangular piece 160. The next step is to form in strip 161A an initial central corrugation having a tapered triangular configuration. The result is strip 161B with initial corrugation 162. Initial corrugation 162 must be carefully formed to have its axis perpendicular to an intersecting tangent line of the curved strip. A tapered file of the proper size or a specially made tapered forming tool is used to produce the initial corrugation, which is then marked for later reference with paint or ink.

Strip 161B is then inserted between gear-like members 124 and 125 with initial corrugation 162 over one of the tapered teeth, and gear-like members 124 and 125 are brought together and locked by locking apparatus 140 into a substantially meshed relationship. Crank 130 is then turned in one direction to form the first half of an initial strip. Preferably, the strip is removed and repositioned with the central reference corrugation between substantially meshed teeth, and crank 130 is turned in the opposite direction to form the second half of an initial corrugated strip. These steps result in a strip such as 161C in FIG. 15.

It should be noted that, when strip 161B is inserted in the apparatus 120 of FIG. 10, it is placed on the left end of gear-like members 124 and 125; and as crank 130 is turned, the strip is pulled toward the right. Strip 161C therefore has generally triangular, tapered corrugations which vary in width and depth from center to edge and have rounded corners.

The next step is to press initial corrugated strip 161C between male and female forming dies, the male die 150 being shown in FIGS. 11 and 12. This step produces the final corrugated strip 161D which is trimmed to a rectangle while in the forming dies. A large number of these final corrugated strips are made for assembly into a final collimator product.

FIG. 16 shows a collimator assembly fixture 170 which is employed in assembling the final product. A base 171 holds a collimator base plate 180 on which individual corrugated and straight strips will be mounted and fastened during the process of gluing individual strips together. Support members 172 and 173 are rigidly mounted to base 171, and alignment arm 176 is pivotally mounted to support member 172 by a pivoting mechanism 174. Alignment arm 176 has a telescoping portion 175 with an alignment wiper arm 177 at the end thereof. A stop block 178 rests on top of base plate 180 during the construction of the first half of the collimator.

Final assembly of the collimator follows this procedure. Base 171 is tilted somewhat so that an initial corrugated strip may be rested on stop block 178 such that it touches base plate 180 and points along line 179 to the pivot line of alignment arm 176. A first straight strip with both sides glued is rested on the initial corrugated strip and a second corrugated strip is mounted on the first straight strip. Alignment wiper arm 177 is employed to press the strips together to ensure good contact and to ensure that the second corrugated strip points toward the pivot of alignment arm 176. It should be noted that the pivot line is set in terms of the taper of the individual corrugated strips so that the strips quite naturally stack to point toward that pivot line. The alignment arm ensures that the strips are tightly pressed together and proper alignment is maintained. Straight and corrugated strips are added, each time using alignment arm 176 until one half of a collimator is built up. The glue on the strips tends to run down between assembled strips and automatically glues the assembled strips to base plate 180. To assemble the second half of the collimator, stop block 178 is removed and base plate 180 is turned around so that strips can be built up in the other direction. The resultant collimator has triangular channels which generally focus to a short line segment, which is entirely adequate for purposes of gamma imaging with a radiation camera.

FIG. 17A shows the imaging properties of a diverging collimator 210A which enables the imaging, on a radiation sensitive transducer 260A, of an object 290A which is larger than transducer 260A. It is called a diverging collimator because its collimating apertures diverge in the transducer to object direction. Dashed lines 211A and 212A portray the diverging field of view of the collimator.

FIG. 17B shows the imaging properties of a converging collimator 210B which enables magnification imaging, on a radiation transducer 260B, of an object 290B which is smaller than transducer 260B. It is considered a converging collimator because its collimating apertures converge in the transducer to object direction.

From the above it should be apparent that the method of this invention is capable of producing all three forms of low energy multichannel collimators---parallel, converging, and diverging channel units. The method results in high quality collimators at low manufacturing cost.

FIGS. 18 and 19 illustrate an alternate method of forming initial corrugated strips. A pair of forming tools 273 and 274 pivoted at point 275 press portions of lead foil 161E into tapered grooves of male forming die 150. Forming heads 271 and 272 are tapered to match grooves in forming die 150. After making an initial central corrugation, using head 272 to push foil 161E into the groove in the forming die, head 272 holds the initial corrugation in that groove while head 271 pushes foil into an adjacent groove to form the next corrugation. Both heads are then shifted one groove and head 272 holds the last made corrugation while head 271 forms the next adjacent corrugation. This continues until all the corrugations are formed in an initial corrugated strip, and then the female die is mated to the male die and pressure exerted to make the final corrugated strip. Assembly of corrugated strips made by this alternate method into a final collimator would proceed as set forth above.

The above description is intended to be exemplary of general concepts of methods of constructing corrugated collimators, and many changes could be made without departing from the scope of the invention as claimed in the following claims.

I claim:

1. A method of making a radiation imaging collimator having collimating apertures converging substantially to a common focus comprising the steps of:
   a. producing a plurality of flat strips of lead foil about 0.01 inches in thickness and of uniform width having opposing curved concave and convex edges;
   b. inserting each strip, one-at-a-time, between a pair of partly meshed bevel gears having longitudinally extending teeth that focus to a common point such that each of said strips is positioned with said convex edge proximate to said focal point and with said concave edge remove from said focal point;
   c. rotating said bevel gears in a direction to sequentially form individual longitudinal corrugations so as to produce an initial corrugated strip;
   d. pressing, one-at-a-time, said initial corrugated strips between male and female forming dies to produce final corrugated strips having highly regular, reproducible configurations;
   e. mounting each of said corrugated strips between successive straight strips of lead foil each about 0.01 inches in thickness to produce a plurality of collimator apertures wherein all of said initial corrugated strips are positioned in alignment with each other; and
   f. compressing said mounted strips to ensure alignment of said apertures such that all of said apertures are directed toward a common focus.

2. The method of claim 1, further comprising initially forming in each lead strip to be corrugated an initial central corrugation having a tapered triangular configuration; inserting each strip to be corrugated between said pair of partly meshed bevel gears with said initial central corrugation between partly engaged teeth of said bevel gears; rotating said bevel gears in a first direction to form one half of the inital corrugations; repositioning said strip between said bevel gears with said initial central corrugation between partly engaged teeth as aforesaid; and rotating said bevel gears in the direction opposite said first direction to form the other half of said initial corrugations.

3. The method of claim 2, further comprising the step of marking said central corrugations subsequent to their formation for later reference in aligning said corrugated strips.

4. The method of claim 1, further comprising the step of coating each of said straight strips on both sides with an adhesive prior to mounting said corrugated strips therebetween.

5. The method of claim 1, wherein said mounted strips are compressed against a base with an arm hinged at said common focus to ensure alignment and orientation of said straight and corrugated strips toward the aforesaid common focus.

* * * * *